B. FORD.
SECONDARY OR STORAGE BATTERY.
APPLICATION FILED DEC. 29, 1911.
1,068,640.
Patented July 29, 1913.
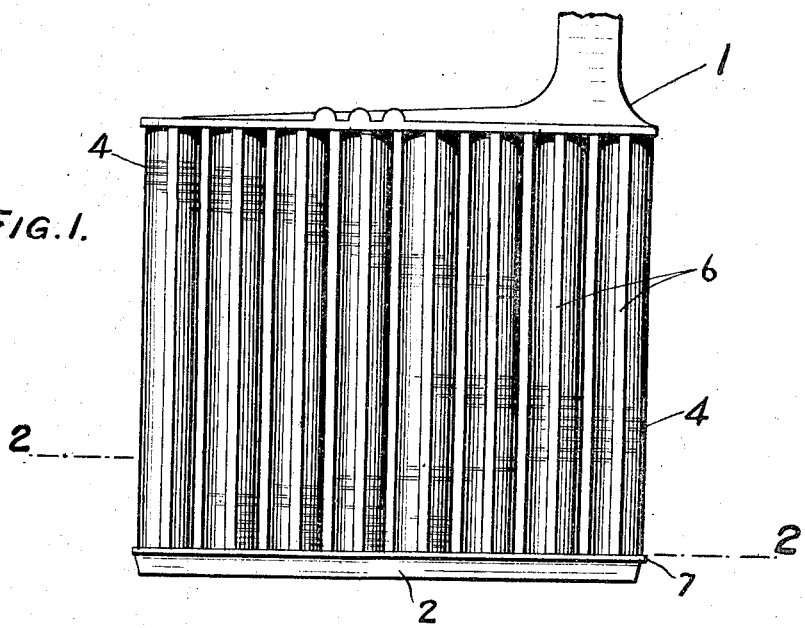
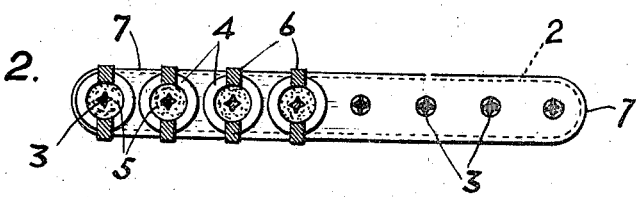
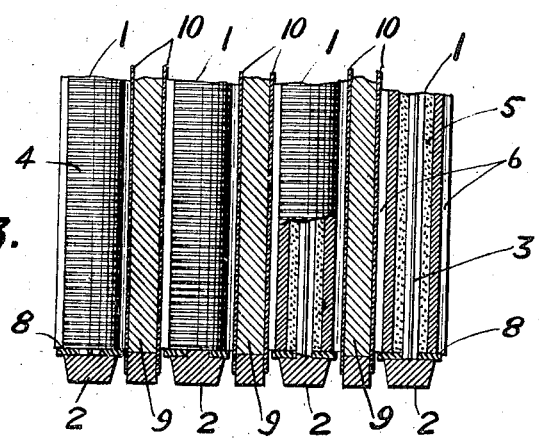
WITNESSES:
Rob't R Ketchel.
Frank E Hunch.
INVENTOR
Bruce Ford
BY
Augustus B Stoughton
ATTORNEY.

UNITED STATES PATENT OFFICE.

BRUCE FORD, OF PHILADELPHIA, PENNSYLVANIA.

SECONDARY OR STORAGE BATTERY.

1,068,640.  Specification of Letters Patent.  Patented July 29, 1913.

Application filed December 29, 1911. Serial No. 668,479.

*To all whom it may concern:*

Be it known that I, BRUCE FORD, a citizen of the United States, and a resident of Philadelphia, in the county of Philadelphia and State of Pennsylvania, have invented certain new and useful Improvements in Secondary or Storage Batteries, of which the following is a specification.

The present invention relates to batteries in which use is made of negative pole plates, wood or like separators and positive pole plates, which include a metallic bottom frame having rods surrounded by appropriate tubes which confine the active material or material to become active and the invention is concerned principally with improvements in the positive pole plates and in their coöperation with the negative pole plates.

The object of the present invention is to prevent short circuits between the positive and negative pole plates.

The invention will be claimed at the end hereof, but will be first described in connection with the accompanying drawings, forming part hereof, and in which—

Figure 1, is a side view of a positive pole plate embodying features of the invention. Fig. 2, is a transverse sectional view taken on the line 2—2 of Fig. 1, and Fig. 3, is a diagrammatic view illustrative of the operation of the invention.

1 is a plate usually used as a positive pole plate and it includes a bottom conducting frame 2 having conducting rods 3 and permeable insulating tubes 4 between which and the rods active material or material to become active 5, is arranged.

6, are ribs projecting laterally from the tubes.

7, is a laterally extending insulating sheet, as of hard rubber, overlying the bottom frame 2 and closing the lower ends of the tubes 4 and terminating inside of the ribs 6. There is thus formed an insulating shelf or support 8 which receives falling sediment and insulates it so that it cannot form a short circuit between the positive pole plate 1, and the negative pole plate 9, even if the separators 10, as of wood, should break down or be defective.

What I claim is:

1. The combination in a storage battery plate of laterally extending insulating spacing projections, a bottom frame, and an insulating cover applied to the top of the bottom frame to form an insulating shelf for sediment and terminating inside said projections to afford space through which sediment may fall.

2. The combination in a storage battery plate of insulating tubes provided with laterally extending spacing ribs, a bottom frame, and an insulating cover applied to the top of the bottom frame and extending laterally beyond the bottom frame and terminating inside of said ribs, substantially as described.

In testimony whereof I have hereunto signed my name.

BRUCE FORD.

Witnesses:
S. E. PATTERSON,
FRANK E. FRENCH.